Jan. 25, 1949.    W. M. SCHWEICKART    2,459,969
VARIABLE SPEED DRIVE
Filed July 20, 1944    4 Sheets-Sheet 1
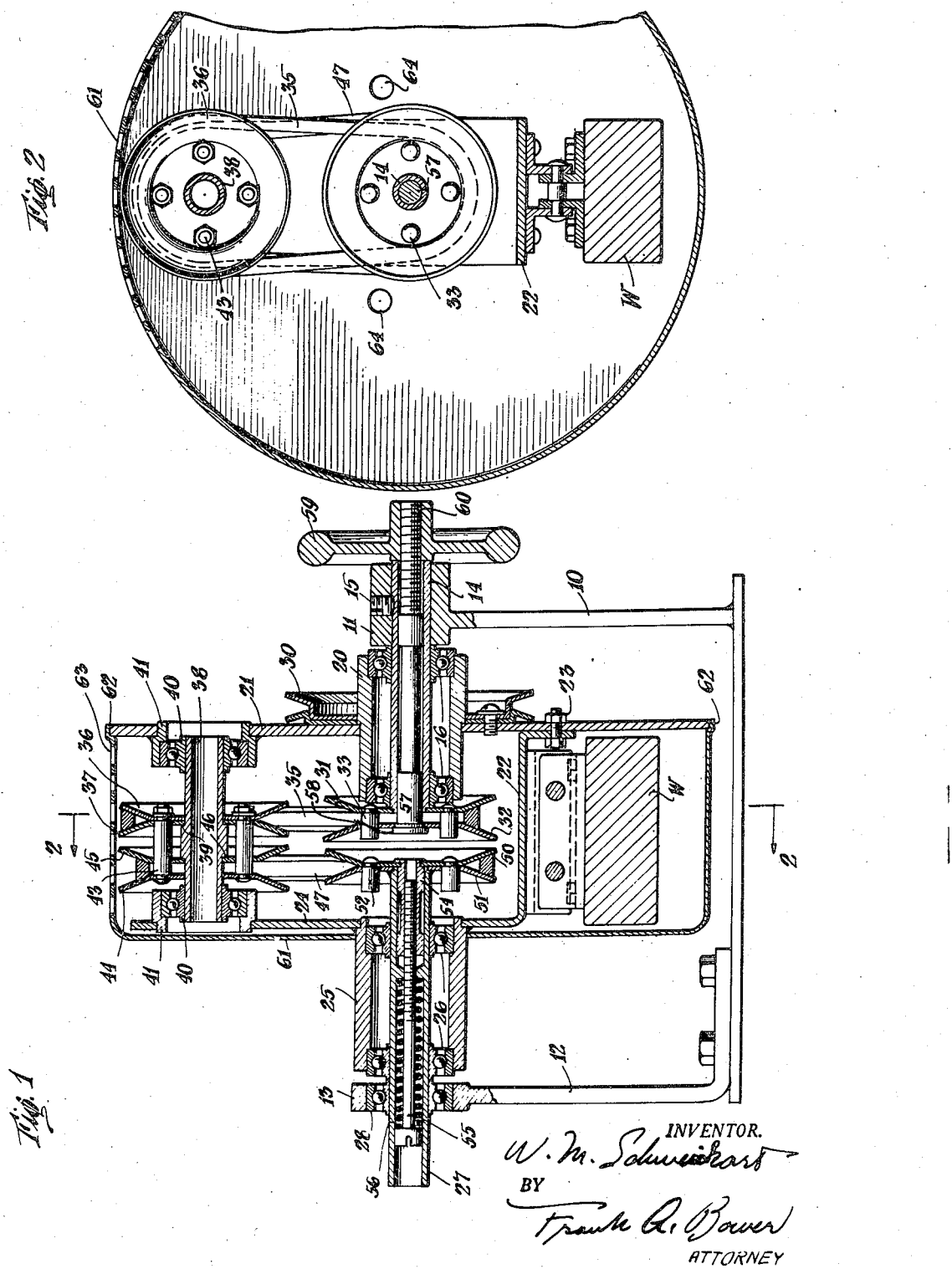
INVENTOR.
W. M. Schweickart
BY
Frank A. Bower
ATTORNEY

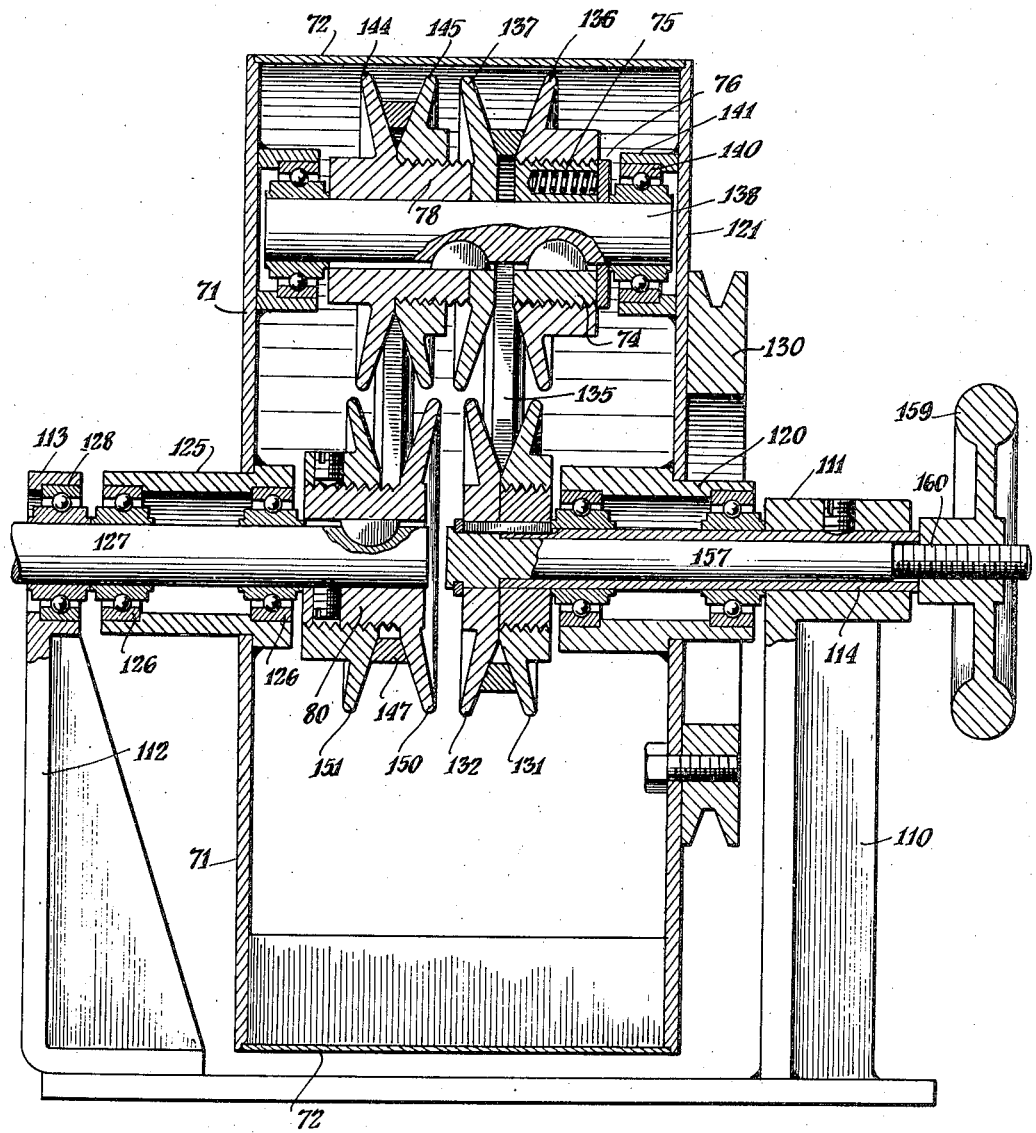

Jan. 25, 1949.  W. M. SCHWEICKART  2,459,969
VARIABLE SPEED DRIVE
Filed July 20, 1944  4 Sheets-Sheet 3

INVENTOR.
W. M. Schweickart
BY Frank A. Bower
ATTORNEY

Jan. 25, 1949.  W. M. SCHWEICKART  2,459,969
VARIABLE SPEED DRIVE
Filed July 20, 1944  4 Sheets-Sheet 4

INVENTOR.
W. M. Schweickart
BY
Frank A. Bower
ATTORNEY

Patented Jan. 25, 1949

2,459,969

UNITED STATES PATENT OFFICE 2,459,969

VARIABLE-SPEED DRIVE

William M. Schweickart, Bay Village, Ohio

Application July 20, 1944, Serial No. 545,791

15 Claims. (Cl. 74—793)

This invention relates to variable speed drives and particularly to variable speed transmissions which are belt driven.

The object of the invention is to provide a driving means which will be inexpensive in construction and quiet and durable in operation.

Figure 4:
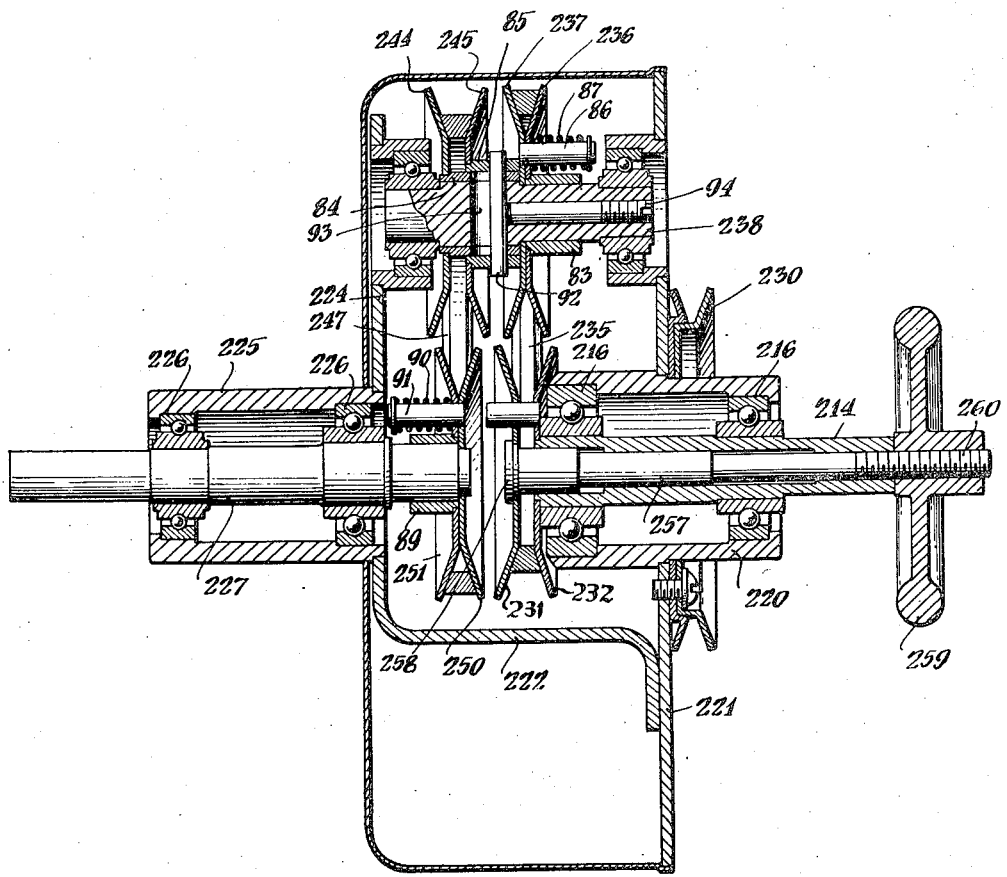
Figure 5:
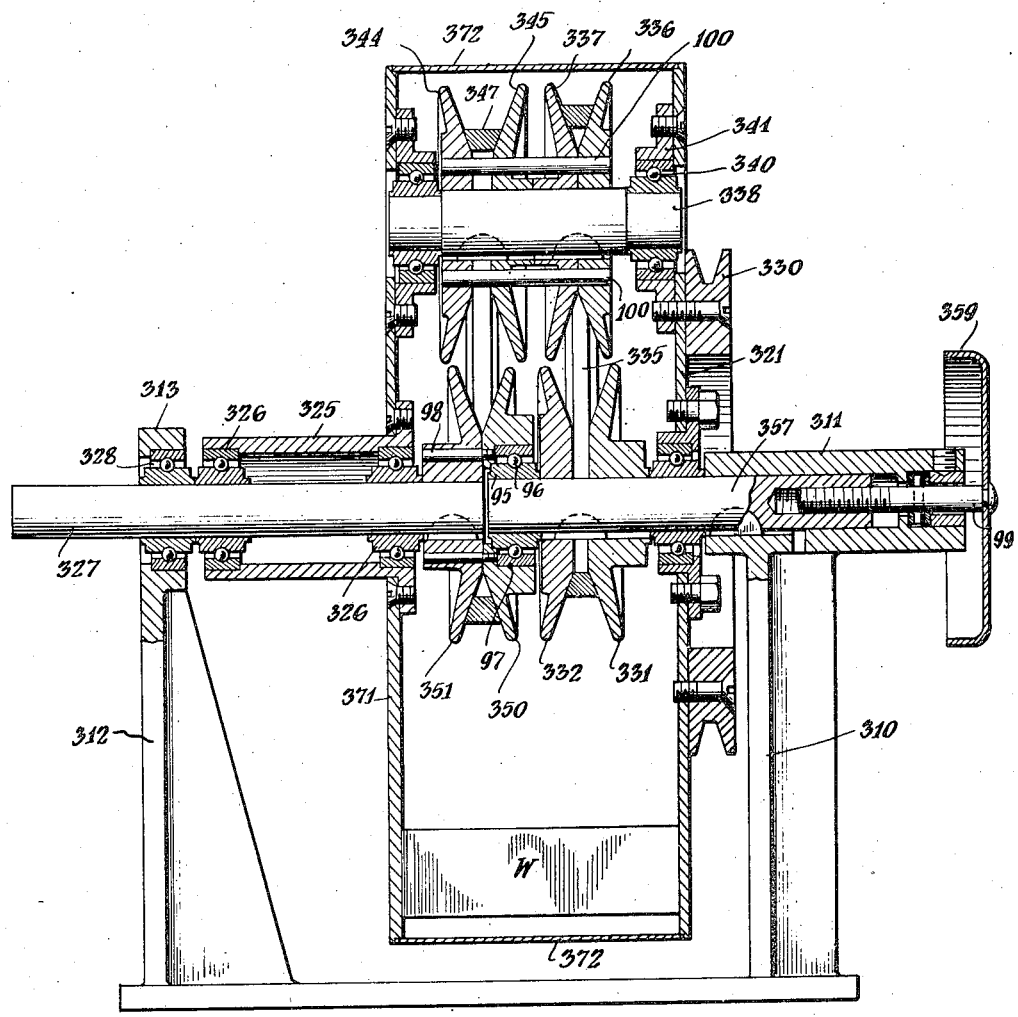

A further object of the invention particularly in the construction and combination of the elements to give a wide variation in speed will appear from the following specification taken in connection with the accompanying drawings in which Fig. 1 is a vertical sectional view of a typical variable speed drive, Fig. 2 is a transverse sectional view taken on line 2—2 of Fig. 1; and Figs. 3, 4 and 5 are views similar to Fig. 1 and illustrating modified forms of transmissions.

In the specific embodiment of the invention shown in the drawings, the variable speed transmission is shown mounted on bracket arms 10, 12, arm 10 carrying the supporting bushing 11 and arm 12 carrying the bearing housing 13. A tube 14 is fastened in bushing 11 by set screw 15 and mounted on the tube 14 are the bearings 16 carrying the cylinder 20 to which is rigidly fastened the plate 21 to which is bolted at 23 the L-shaped bracket member 22, 24, the leg 24 of which is rigidly fastened to the end of the cylinder 25 supported by bearings 26 from the rotatable tube 27 which protrudes out through the bearing 28 carried by the housing 13 of the arm 12.

A V-pulley 30 is fastened to the face of the plate 21 to drive the entire rotatable assembly including the cylinders 20, 25, plate 21, bracket 22, 24 and the parts carried by these members, the output for the drive being provided by the tubular shaft 27 at the opposite end of the drive.

One side 31 of a V-pulley is rigidly fastened to the end of the fixed tube 14, the other side 32 of the pulley being slidably supported on pins 33 rigidly fastened to the hub of the pulley disk 31. A V-belt 35 is under constant tension tending to separate the V-pulley disks 31, 32 the amount of separation and therefore the effective diameter of the pulley being controlled by the rod 57 engaging the pulley disk 32 by the flanged head 58 and drawing it toward the disk 31 under the action of the adjusting wheel 59 threaded on to the shaft 57 at 60.

The belt 35 passes around the upper V-pulley 36, 37 mounted against the shoulder 39 of the tubular shaft 38. Turning on bearings 40 are bushings 41 fixed in place in the plate 21 and bracket piece 24. Pins 43 fastened to V-pulley disk 36 pass slidingly through holes in V-pulley disk 37 and so permit the disks to separate by movement of the disk 36 to the right along the shaft 38 as the belt 35 is tensioned by the forcing together of the V-pulley disks 31, 32 under the action of the adjusting wheel 59.

Also mounted on the shaft 38 is the V-pulley 44, 45 with its disk 45 against the shoulder 46 of the shaft and its disk 44 rigidly fastened to the left ends of the pins 43 to connect this disk 44 to move with the disk 36 of the V-pulley 36, 37.

The V-belt 47 exerts a constant tension tending to separate the disks 44, 45 and runs around the central V-pulley 50, 51 having its disk 51 fastened rigidly to the end of the tubular shaft 27 and its disk 50 provided with pins 52 sliding in holes in the disk 51 and permitting these disks to separate under tension of the belt 47. Disk 50 is fastened to the end of the sliding cylinder 54 housed in the shaft 27 and yieldingly drawn to the left (Fig. 1) by the bolt 55, the head of which is engaged by the expanding spring 56.

This spring 56 thus tends to draw the V-pulley disks 50, 51 together to force the V-belt 47 out toward the periphery of the pulley as shown in Fig. 1 and correspondingly drawing the V-belt 47 inward between the V-pulley disks 44, 45, the belt 47 being of a proper length to spread the disks 44, 45 when running around the outer portion of the V-pulley 50, 51. Since the V-pulley disks 44, 36 are connected to move together the inner position of the belt 47 forcing the disk 44 to the left draws the disk 36 to the left toward the disk 37 and correspondingly forces the belt 35 outward toward the periphery of the V-pulley 36, 37 as shown, at the same time tending to force the belt inward to spread the V-pulley disks 31, 32 apart as far as permitted by the adjustment of the hand wheel 59. The belt 35 is properly proportioned as to length to run to a small pitch diameter on V-pulley 31, 32 when running at a relatively large diameter on the V-pulley 36, 37.

In the operation of the transmission a V-belt (not shown) through the pulley 30 drives the rotatable parts, the V-pulley 31, 32 remaining stationary and V-pulleys 36, 37 and 44, 45 being carried around with the rotatable casing 21, 22, 24 and V-pulley 50, 51 either standing still or rotating at a variable speed depending upon the adjustment of the hand wheel 59. If this hand wheel is adjusted to bring the belts 35, 47 to the same or equalizing pitch diameters on the pulleys, the V-pulley 50, 51 and the output shaft will stand substantially still. As the handle 59 is adjusted for instance to separate the stationary disks 31, 32 the belt 35 will creep out between the disks 36, 37 permitting these disks to be drawn together and correspondingly separating the disks 44, 45 to permit the belt 47 to creep inward on this V-pulley 44, 45 and outward on the V-pulley 50, 51.

A counter-weight W is preferably provided fastened to the frame member 22 as shown and of a weight acting to counterbalance the mechanism on the opposite side of the rotary assembly. The cover 61 of thin metal enclosing the movable parts is carried by the end plate 21 by flanged connections 62 as shown and is provided with ventilating openings for instance outlet perforations 63 at the periphery and intake openings 64 near the center, the resulting currents of air acting to maintain a cooling effect to prevent undue temperature rises.

The tension of spring 56 may be varied by adjustment of the bolt 55, this tension being sufficient to hold the disks in position against the component of belt tension due to centrifugal force and the driving pull at each adjustment.

There is thus during the operation of the device a force tending to draw the disks and the belts into the position shown in Figs. 1 and 2 in which the rotary speed of the pulley 30 is transformed into reduced rotary speed of the shaft 27. Depending upon the sizes and angles of the pulleys and the lengths of the belts, this reduction may be any desired amount, for instance to anything between 30% and 80% of the angular velocity of the pulley 30. As the hand wheel 59 is turned to draw the disks 31, 32 toward each other the speed of the shaft 27 for a given drive at pulley 30 is still further reduced and continued turning of the handle 59 bringing the belts 35, 47 to substantially the same pitch diameters will reduce the speed of rotation of shaft 27 to zero. During this adjustment the shaft 27 turns in the same direction as the pulley 30.

Further rotation of the hand wheel 59 drawing disks 31, 32 closer together and forcing the belt 35 outward to a pitch diameter on pulley 31, 32 greater than the pitch diameter of this belt on pulley 36, 37 reverses the direction or rotation of the shaft 27 and progressively increases it to some proportion of the speed of the pulley 30 depending on the characteristics of the moving parts and the degree of adjustment of the hand wheel.

Various structure details may be adopted depending upon the size of the apparatus and the power to be transmitted, and the resilient means applying a yielding closing force to the pulley sections may be variously applied. In Fig. 3 a modified structure is shown in which the applied reference numerals are 100 above the comparative features of the numerals appearing in Figs. 1 and 2. In this Fig. 3 apparatus the face plate 121 has an opposite similar face plate 71, the two being connected by a peripheral band 72 forming a rigid drum rotatably supported on the cylinders 120 and 125. The V-pulley 136, 137 has its sections spring-pressed toward each other by the springs 75 in bushing 74 screw threaded within the hub of the pulley section 136. The ends of the springs 75 bear against the ring 76 stopped against the inner raceway of the bearing 140 on shaft 138. The tendency of the springs is to force the pulley sections 136, 137 together, these sections being separated under the tension of the V-belt 135 when the inner pulley sections 131, 132, are forced together by the turning of the hand wheel 159 drawing the rod 157 to the right (Fig. 3).

The other pair of pulleys 144, 145 and 150, 151 are fixed in adjustment, pulley section 145 being threaded and set on the hub 78 of the pulley section 144. Similarly, the hub of pulley section 151 is threaded on the hub 80 of pulley section 150 and fastened in place thereon by set screw 81. In Fig. 3 these pulleys are set to an extreme increase in diameter of outer pulley 144, 145 over inner pulley 150, 151.

With the hand wheel 159 adjusted as shown in Fig. 3 the belt 135 is drawn inward to extreme inner position between the sections of pulley 136, 137 so that the drive ratio between the input pulley 130 and the output shaft 127 is about one to .8, the shaft 127 rotating in a direction opposite to the direction of the pulley 130. As the hand wheel 159 is turned to permit separation of the pulley sections 131, 132 belt 135 will creep upward permitting the pulley sections 136, 137 to be pressed together by the springs 75 and the relative speed of the output shaft 127 will progressively decrease until a zero speed is reached when the relative pitch diameters of the pulley pairs are the same. That is when the pitch diameter of the belt 135 on its outer pulley is in the same proportion to the pitch diameter of this belt on the inner pulley as the pitch diameter of the belt 147 on its outer pulley is to its pitch diameter on its inner pulley.

In the modification shown in Fig. 4, the reference numerals are 200 above the reference numerals applied to the comparative features in Figs. 1 and 2, the main differences being in the construction of the outer V-pulleys and the inner output pulleys. The disk 236 is fixed in place on the bushing 83 fastened to the shaft 238 and the pulley disk 244 is fixed in place on the bushing 84 also fastened to the shaft 238. A third bushing 85 carries the pulley disk 245 at one end and at the other end bears against the pulley disk 237 to which is fixed a pin 86 carrying a spring 87 yieldingly pressing the disk 237 toward the disk 236.

The inner output pulley has its disk 250 fastened to the end of the output shaft 227 and its disk 251 and its hub bushing 89 sliding on said shaft and held toward said disk 250 by springs 90 on pins 91 fastened to the disk 250 so that the belt 247 is squeezed toward the outer portion of the pulley 250, 251 and inward between the disks of the pulley 244, 245 as shown, the corresponding movement of the disk 245 being limited by the movement of the vertical pin 92 fixed in the bushing 85 and extending through a slot 93 in the shaft 238. Threaded pin 94 in said shaft 238 is adjustable to restrict the movement of the pin 92 and the disk 245.

In the position of the parts shown in Fig. 4, the hand wheel 259 is adjusted to permit opening of the disks 231, 232 under the action of the springs 87 forcing the disks 236, 237 together to crowd the belt 235 toward the periphery of the pulley. At the same time the spring 90 has pressed the disks 250, 251 together to move the belt 247 outward on the lower pulley and inward on its upper pulley forcing the disk 245 to the right until stopped by the adjustment of the pin 94. In this way the ratio of the diameters of the pitch circles of the pulleys 244, 245 and 250, 251 may be readily adjusted and set as desired. Turning of the hand wheel 259 bringing the disks 231, 232 toward each other shifts the belt 235 outward on its lower pulley and inward on its upper pulley to reduce the speed of the output shaft 227 and finally bring it to zero as the ratio of pitch diameters of these pulleys to the right (Fig. 4) approaches the ratio of the pitch diameters of the pulleys to the left as set by the pin 94.

In this arrangement only the two pulleys 231, 232 and 236, 237 are affected by the adjustment of the hand wheel, the other two pulleys being adjusted by the position of the adjusting pin 94. Thus, the two sets of pulleys are adjusted separately. The purpose of this is to afford a preselection of the speed range. In some applications it might not be desirable to go into reverse but to add the reverse range to the forward speed such as from zero to 2 to 1 ahead. Thus, threaded pin 94 is a range adjustment and not a limit of the range.

In Fig. 5 with reference numerals 300 above the comparative parts of Fig. 1, the adjacent disks 332, 350 of the inner pulleys are moved together at the inner end of the adjusting shaft 357. A bushing 95 at the end of the sliding shaft 357 serves as a raceway for ball bearings 96 running in a raceway 97 fixed in the hub of the pulley disk 350 so that shifting of the shaft 357 carries the disk 350 with it, the sliding connection with disk 351 being provided by pins 98 sliding in recesses in the disk 351 and fastened in the hub 350. Hand wheel 359 carries the threaded shaft 99 adjusting the sliding shaft 357 without rotating the latter. The outer pulleys have their disks 344, 336 connected by pins 100 fixed in these disks and slidingly passing through openings in the disks 345, 337 so that these central disks 345, 337 with their hubs in contact as shown and sliding on the shaft 338 are free to move together as the belts 335, 347 are adjustable by adjustment of the disks 332, 350.

This mechanism of Fig. 5 is thus advantageous in avoiding reliance on spring pressed parts, and at the same time giving compensating variation of all of the pulleys. The adjustments of the pulley 331, 332 and 350, 351 are positive and similarly the corresponding shifting of the outer pulley parts 337, 345 automatically follows through the resulting tensions of the belts 335, 347.

The mechanism of this invention thus provides continuous stepless variation in output speed over a wide range from a constant power source with an infinite high ratio of input to output speeds. This ratio may be varied from full forward speed down to zero and into full reverse, and these objects are attained with high efficiency and without the use of gears and by simple, smooth and quiet running and inexpensive equipment.

The drive may be manufactured or set for any desired fixed speed where variations in speed are not called for.

Various modifications of the mechanism may be made within the scope of this disclosure. For instance, the power supply may be applied to the shaft 27, 127, 227, 327 and the output taken from the corresponding pulley 30, 130, 230 and 330 so that the entire housing will rotate to deliver the power under the action of the inner belts at various adjustments. Either forward or reverse rotation of the pulley 30, 130, 230 and 330 will result depending on the relative settings of the V-pulleys.

The radially extending plates 21, 24 form supporting means for the input and the outer pulleys which latter together with the central pulleys are assembled between the inside surfaces of these plates while the input pulley 30 (and also pulleys 130 and 230) are on the outside surfaces of the corresponding plates.

The invention is not confined to the specific modification shown and described and is intended to cover such variations thereof as fall within the scope of the appended claims.

I claim:

1. In a variable speed drive a rotary support, an inner non-rotatable driving pulley, an inner rotary driven pulley, an outer pair of pulleys comprising relatively shiftable pairs of pulley disks each pair having its disks in fixed axial spacing with respect to each other, said outer pulleys being carried by said support and rotating together, belts driving said outer pulleys from said inner non-rotatable pulley and said driven pulley from said outer pulleys upon rotation of said support, and means varying the pitch diameter of the inner pulley of at least one of said belts to conversely vary the pitch diameter of the cooperating pulley through the action of the belt on its pulleys to change the rotary speed of said inner driven pulley relative to the rotary speed of said support.

2. A variable speed drive as set forth in claim 1 in which there is means varying the pitch diameter of the belt on the inner non-rotatable pulley to vary the relative speed between the inner driven pulley and the support, said speed varying means being operable to change the speed during rotation of said support.

3. A variable speed drive as set forth in claim 1 in which the inner non-rotatable driving pulley is variable in pitch diameter by hand controlled adjusting means and the remaining pulleys are yieldingly responsive to automatically and correspondingly vary their pitch diameters.

4. A variable speed drive comprising a rotatable support, a plurality of inner pulleys coaxial with said support and comprising relatively shiftable pairs of pulley disks each pair having its disks in fixed axial spacing with respect to each other, a plurality of outer pulleys having axes rotating with said support, belts connecting said inner and outer pulleys, power transmitting means connected to one of said inner pulleys and to said support, and means for adjusting the pitch diameter of an inner pulley and simultaneously automatically adjusting the pitch diameter of the cooperating outer pulley for varying the relative speed of at least one of said inner pulleys with respect to the speed of its corresponding outer pulley to vary the relative speed of rotation of said support with respect to the speed of rotation of one of said inner puleys during rotation of said support.

5. A variable speed drive as set forth in claim 4 in which the inner pulleys have adjusting means simultaneously varying the pitch diameters of the belts on these pulleys to correspondingly vary the relative speed of rotation of the support.

6. A variable speed drive as set forth in claim 4 in which the inner pulleys have means positively adjusting said pulleys to vary the pitch diameters of their belts and correspondingly control the speed of rotation of the support.

7. A variable speed drive as set forth in claim 4 in which one of the inner pulleys is non-rotatable and has adjusting means operable during the rotation of the support to vary the speed of the support relative to the other inner pulley.

8. A variable speed drive as set forth in claim 4 in which both inner pulleys have relatively non-rotatable adjusting means acting to vary the pitch diameters of their belts during rotation of said support.

9. A variable speed drive comprising a rotary support, a non-rotatable member coaxial with the axis of rotation of said support, an outer rotary means carried by said support spaced from the axis and comprising a pair of V-pulleys engaged respectively by driving and driven belts and including one pulley formed by a plurality of separate disks adapted to automatically move axially together to increase the pitch diameter of the pulley between said disks and automatically corresponding shift the respective cooperating belt, means connecting one of said disks in fixed spaced relation to a disk of the other V-pulley; a rotary driven member coaxial with said support, said belts connecting said non-rotatable member and said rotary driven member with the V-pulleys of said outer rotary means, and means operable during the rotation of said support for varying the pitch diameter of the belt on one of said members to simultaneously automatically vary the pitch diameter of said cooperating belt between said axially moving disks of said outer rotary means and correspondingly regulate the rate of rotation of said rotary driven member with relation to the rate of rotation of said support.

10. A variable speed drive comprising a rotary support, a non-rotatable member coaxial with the axis of rotation of said support, an outer rotary means carried by said support spaced from the axis and comprising a pair of V-pulleys engaged respectively by driving and driven belts and including a plurality of separate disks tending to automatically move axially together to increase the pitch diameter of the pulley between said disks and automatically correspondingly shift the cooperating belt, a rotary driven member coaxial with said support, said belts connecting said non-rotatable member and said rotary driven member with said outer rotary means, and means operable during the rotation of said support for varying the pitch diameter of the belt on one of said members to simultaneously automatically vary the pitch diameter of said belt between said axially moving disks of said outer rotary means and correspondingly regulate the rate of rotation of said rotary driven member with relation to the rate of rotation of said support, said control means comprising a movable adjusting means coaxial with said rotary support and connected to one of said members to vary its pitch diameter.

11. A variable speed drive comprising a rotary support, a non-rotatable member coaxial with the axis of rotation of said support, an outer rotary means carried by said support spaced from the axis and comprising a pair of V-pulleys engaged respectively by driving and driven belts and including a plurality of separate disks tending to automatically move axially together to increase the pitch diameter of the pulley between said disks and automatically correspondingly shift the cooperating belt, a rotary driven member coaxial with said support, said belts connecting said non-rotatable member and said rotary driven member with said outer rotary means, and means operable during the rotation of said support for varying the pitch diameter of the belt on one of said members to simultaneously automatically vary the pitch diameter of said belt between said axially moving disks of said outer rotary means and correspondingly regulate the rate of rotation of said rotary driven member with relation to the rate of rotation of said support, said control means comprising a movable adjusting means coaxial with said rotary support and connected to said stationary member to vary its pitch diameter.

12. A variable speed drive comprising a rotary housing, an inner non-rotatable member in said housing coaxial with the axis of rotation of said housing, an outer rotary means within said housing spaced from the axis and comprising a pair of V-pulleys engaged respectively by driving and driven belts and including a plurality of separate disks tending to automatically move axially together to increase the pitch diameter of the pulley between said disks and automatically correspondingly shift the cooperating belt, an inner rotary driven member coaxial with said housing, said belts connecting said non-rotatable member and said rotary driven member with said outer rotary means, and control means operable during the rotation of said housing for varying the pitch diameter of the belt on one of said members to simultaneously automatically vary the pitch diameter of said belt between said axially moving disks of said outer rotary means and correspondingly regulate the rate of rotation of said rotary driven member with relation to the rate of rotation of said housing.

13. In a variable speed drive a rotary support, an inner drive coaxial with said support and an outer drive on an axis rotating with said support, each of said drives comprising a pair of pulley disks in fixed axial spacing relative to said support and a cooperating pair of pulley disks connected in fixed spacing relative to each other and moving axially together relative to said first named disks, belts connecting said inner and outer pulley disks, means for rotating said support, and means for axially moving said inner cooperating pair of pulley disks to increase or decrease the pitch diameters of the belts with relation to the inner and outer disks to vary the relative speeds of rotation of said inner pulley disks.

14. A variable speed drive as set forth in claim 13 in which the inner and outer cooperating pairs of pulley disks connected in fixed relation to each other move in the same direction for each variation in the pitch diameters of the corresponding belts.

15. A variable speed drive comprising a rotor having a radially extending supporting means with radial inside and outside surfaces, a pair of central V-pulleys coaxial with said rotor and positioned adjacent the said inside surfaces of said radially extending supporting means and each pulley comprising a pair of relatively axially adjustable disks to vary the pitch diameter of the corresponding pulley, a support for one pair of said adjustable disks and a control means carried by said support and protruding axially outward from the said central pulleys and accessible at a point outside of said rotor, an outer pair of V-pulleys supported by said radially extending supporting means and located adjacent the inside surfaces thereof and each pulley having relatively axially movable disks varying its pitch diameter, belts connecting said central and outer pulleys, means for rotating said rotor, and means for axially shifting said control means during rotation of said rotor to relatively adjust the said corresponding pair of movable disks of said central pulley and automatically vary the pitch diameters of the cooperating belt on both the said central pulley and the corresponding outer pulley.

WILLIAM M. SCHWEICKART.

REFERENCES CITED

The following references are of record in the file of this patent:

UNITED STATES PATENTS

| Number | Name | Date |
| --- | --- | --- |
| 691,789 | Mann | Jan. 28, 1902 |
| 980,847 | Steinle | Jan. 3, 1911 |
| 2,101,845 | Fraser | Dec. 14, 1937 |
| 2,299,247 | Morgan | Oct. 20, 1942 |

FOREIGN PATENTS

| Number | Country | Date |
| --- | --- | --- |
| 344,145 | France | Oct. 25, 1904 |
| 451,716 | France | Apr. 25, 1913 |
| 568,719 | Germany | Jan. 23, 1933 |